United States Patent [19]
Smedley

[11] 3,832,797
[45] Sept. 3, 1974

[54] FISHING FLOAT

[76] Inventor: Richard W. Smedley, 1008 Alann Dr., Joliet, Ill. 60435

[22] Filed: Feb. 26, 1973

[21] Appl. No.: 335,474

[52] U.S. Cl. ............................................. 43/43.11
[51] Int. Cl. ........................................... A01k 91/00
[58] Field of Search ................................. 43/43.11

[56] References Cited
UNITED STATES PATENTS
2,909,865  10/1959  Ehlert .............................. 43/43.11
3,255,549  6/1966  Riley ................................ 43/43.11

*Primary Examiner*—Antonio F. Guida
*Assistant Examiner*—J. Q. Lever
*Attorney, Agent, or Firm*—John L. Parker

[57] ABSTRACT

A float is provided for use while cast fishing, the float having a circumferential groove capable of storing the portion of the fishing line between the float and the hook and having at least one line engaging surface which is disposed at an angle to the circumferential groove and prohibits the line from unwinding from the groove during casting of the float, line and hook through the air.

2 Claims, 12 Drawing Figures

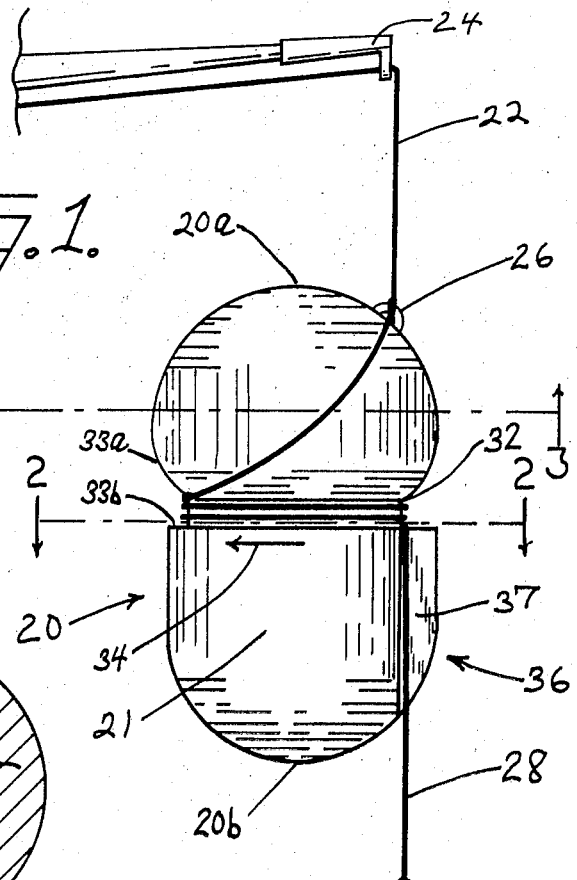
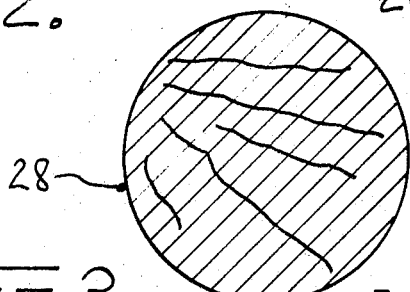
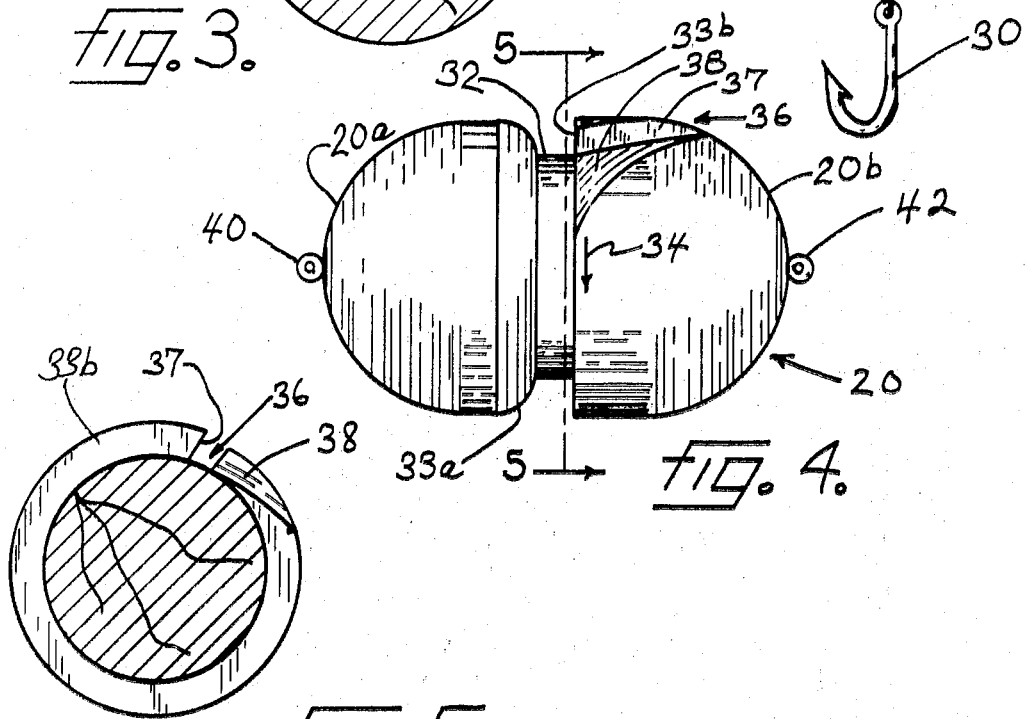

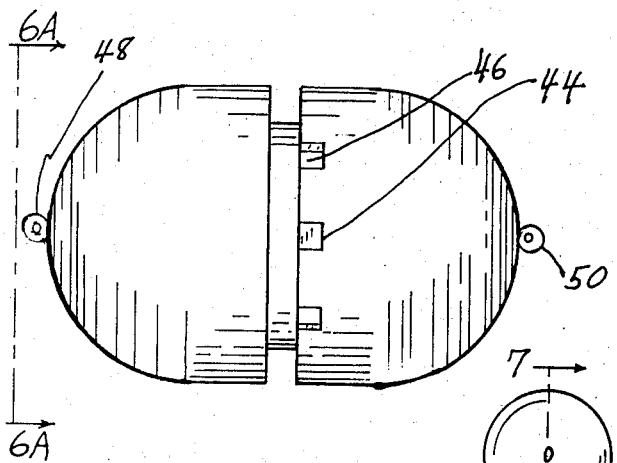
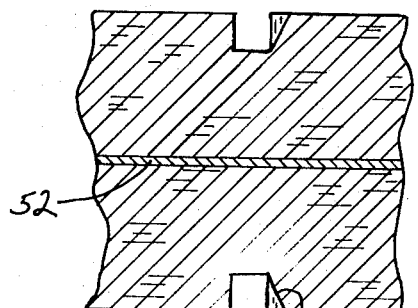
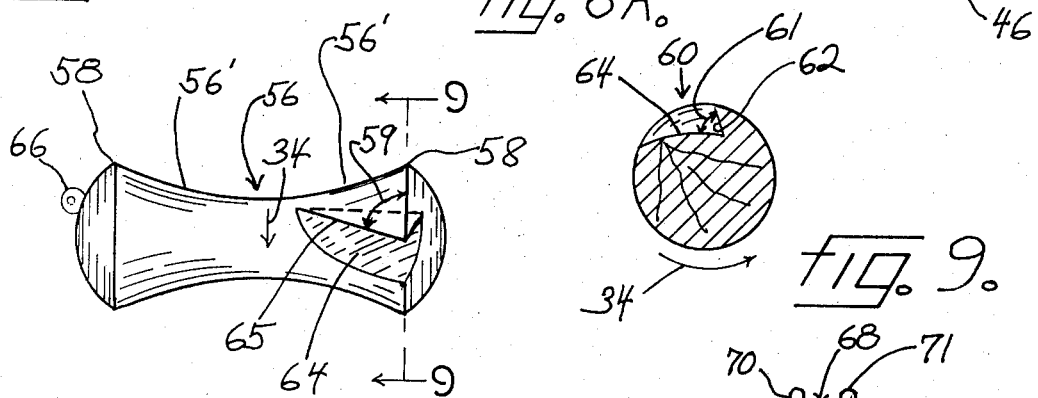
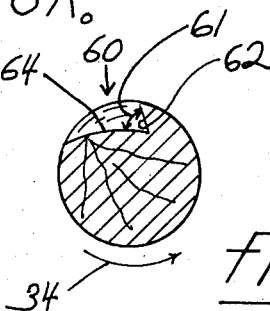
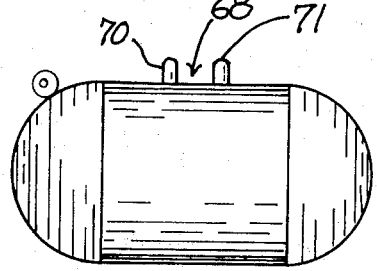
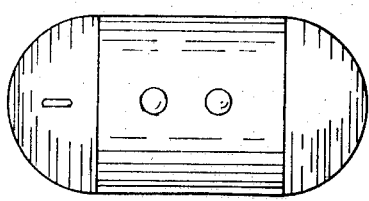

FISHING FLOAT

DESCRIPTION OF THE INVENTION

This invention relates to a fishing float, and particularly to such a float for use in the fishing technique known as casting.

There are many methods of fishing which are proven and productive. One of those methods involves securing a hook to the end of a string, wire, or rope, hereinafter referred to as a "line,", placing bait on the hook, and securing a float or "bobber" to the line a few feet away from the hook. Occasionally a weight or sinker is placed on the line near the hook, or on the hook itself, to keep the hook under the surface of the water.

In casting the fisherman casts the float and hook away from where he is located to a remote location on the water. Most commonly this is accomplished through use of a flexible fishing rod and reel, which the fisherman swings in the air and whips to impart thrust to the float and hook. Casting may also be accomplished manually by the fisherman swinging the line, with the float and hook attached, by hand and imparting thrust to the float and hook in that manner.

One disadvantage of conventional casting techniques is that the float and hook, which are separated by several feet of line, fly apart to the extent of this separation at the time that casting thrust is imparted by the fisherman, with resulting tangling of the float, hook and connecting line therebetween. It is often desirable to have a long section of line, for example 2 to 16 feet, between the float and the hook so that when they have been cast, and reach the desired location on the water, the hook will drop beneath the surface of the water a considerable distance so as to be located at a level where the fish are feeding. Yet whenever the length of line separating the float and hook exceeds about 18 inches the tangling problem becomes virtually inevitable, and the hook is prevented by the tangling from dropping to the desired underwater level. Also, if the length of line separating the float and hook is too great, it becomes impossible to impart the necessary thrust to cast them to the desired location.

It is the primary aim of this invention to provide a float which may be easily cast away from the fisherman and yet which, once in place on the water and once the hook has dropped beneath the water surface, may be located an appreciable distance above the hook. It is a related object of the invention to provide a fishing float for casting which prevents tangling of the float, hook and line in the air during the cast or upon landing on the water. Another object is to provide a float which conveniently stores that portion of the line between the float and the hook during the thrust providing portion of the cast, and yet allows this portion of the line to become free of storage afterwards.

Other objects and advantages of the invention will become apparent upon reference to the drawings in which:

FIG. 1 is a vertical elevational view of a float which is illustrative of the present invention, showing its relationship to a casting rod and a hook prior to imparting thrust to the float.

FIG. 2 is a cross-sectional view taken along line 2—2 of FIG. 1 showing the illustrative float in greater detail.

FIG. 3 is a cross-sectional view taken along line 3—3 in FIG. 1.

FIG. 4 is a horizontal view of another embodiment of the invention.

FIG. 5 is a cross-sectional view taken along the line 5—5 in FIG. 4.

FIG. 6 is a horizontal elevational view of another embodiment of the invention incorporating a plurality of slots.

FIG. 6A is an elevational view taken along the line 6A—6A in FIG. 6.

FIG. 7 is a fragmentary cross-sectional view taken along line 7—7 in FIG. 6A.

FIG. 8 is a horizontal elevational view of yet another embodiment of the invention in which the float has curved and tapered sides and relatively large ends for imparting to its high end buoyancy.

FIG. 9 is a cross-sectional view taken along the line 9—9 in FIG. 8.

FIG. 10 is a horizontal elevational view of still another embodiment of the invention in which the float incorporates protruding members.

FIG. 11 is a plan view of the float shown in FIG. 10.

While the invention will be described in connection with certain preferred embodiments, it will be understood that I do not intend to limit the invention to those embodiments. On the contrary, I intend to cover all alternatives, modifications and equivalents as may be included within the spirit and scope of the invention.

Turning first to FIG. 1, there is shown an illustrative float body 20 attached to a fishing line 22 and rod or pole 24 by means of an eyelet or the like 26 secured to one portion of the body. The same eyelet 26 serves as the point of attachment to the float body for another portion 28 of the line which carries a fishing hook 30. As illustrated, the float body is formed having generally spherically shaped end portions 20a and b, with the eyelet 26 being secured to the end portion 20a.

In keeping with the invention, the float 20 is provided around its midportion with a circumferential groove 32 defined by a first surface 33a and a second surface 33b, both more or less curved but generally radially disposed and opposing each other. The grooves 32 which has the same axis of rotation as that of the float when the float is placed on the water surface provides a storage receptacle space around the float within which the portion 28 of the fishing line may be wound or wrapped and thereby stored during the thrust providing portion of the fisherman's casting activity. As will be seen, the surface 33b farthest from the point 26 of attachment of the float to the rod 24 and line 22 is generally planar, while the other surface 33a is curved. Thus it is seen that the eyelet 26 is located at the opposite end 20a of the float from the end 20b containing the planar surface 33b. This arrangement is advantageous for reasons given below.

In preparing to cast the float and hook, the fisherman wraps the line 28 around the circumferential storage groove 32 of the float 20 in the direction 34 (FIG. 1) until only a short length of line, usually 4 to 12 inches, remains. Preferably the float 20 is manually held with the end 20a uppermost during the wrapping, so that the short length of wrapped line 28 more or less fills the storage groove 32 and ends up disposed adjacent the planar or line engaging surface 37 of the float. Then the remaining unwrapped line portion is laid in a longitudinal line engaging slot or cutaway portion 36 provided along the body portion 20b. As shown, the slot 36 is defined by a surface 37 and a curved body surface 21 and extends from the surface 33b along the length of the body portion 20b. Preferably, the surface 37 is arranged at an angle somewhat less than 90° with respect to the surface 21 to provide optimum retention of the line 28 in the slot. The surface 37 is preferably inclined in the same direction 34 (see FIG. 2) as the line 28 is wrapped around the storage groove 32.

The hook 30 is thus allowed to hang from the float 20 by force of gravity (see FIG. 1). In this position, the line 28 cannot become unwrapped from the storage groove 32 because the engaging surface 37 prevents it. It will be noted that in this position, the storage groove 32 is generally perpendicular to the line 22 from the rod, or in other words, the axis of rotation of the groove is parallel with the line from the rod. Indeed, the engaging surface 37 functions in this manner (to prevent unwrapping) whenever the unstored portion of line 28 is located on the opposite side of the surface 33b than is the securing point 26. If there should be a momentary disengagement between the line 28 and the float 20 because of jiggling or other movement of the rod 24 prior to the case, the line 28 advantageously can only become unstored to the extent of the length of one circumference of the storage groove 32. This is so because the combination of the downward gravitational pull and the cutaway portion 36 will, upon rotation of the float around its longitudinal axis, cause the lne to come into contact with the surface 37 which acts as a stop and thereby brings about immediate re-engagement of the line with engaging surface 37.

The float 20 may be formed of any suitable material of construction that will impart buoyancy sufficient to float on water. Wood, cork or plastic may be used to advantage. Whatever material is used, it is desirable that the float body portions 20a and b be provided with a curved external contour so that the float will be readily rotatable in the water. Thus, by providing the body portions 20a and b with a generally spherical or cylindrical contour it is found that the float is readily rotatable about an axis of rotation generally parallel to the water surface after being cast, so that the weight of the hook causes the float to rotate whereby the hook easily drops to the desired subsurface level as a result of unwinding of the line from the float groove 32. It may also be desirable to have the end 20b slightly more buoyant than the end 20a in order to prevent the line 28 from being engaged by the surface 37 while unwinding from the groove 32 during the period the float is buoyed up and rotating on the water surface.

Preferably, as shown in FIG. 1 the surface 33a defining the storage groove 32 is rounded so as to facilitate unwinding of the line 28 from the groove if, because of differences in speed through the air of the hook 30 and/or bait (not shown) and the float 20 during the cast, the hook and weight become located on the same side of the planar surface 33b as the line securing point 26. Unwinding of the line 28 during the cast after thrust has been imparted to the float and hook, in such a situation is, at most times, desirable because if it does not occur the hook 30 and line portion 28 may become entangled in the line 22 and thus prevent the portion 28 from unwinding out of the storage groove 32 after the float 20 has reached its desired destination and is buoyed up by the water.

If desired, two or more engaging surfaces 37 may be employed at spaced locations around the periphery of the float (not shown). For example, two such surfaces 37 may advantageously be placed 180° apart around the periphery of the groove 32.

Another embodiment of the invention is illustrated in FIGS. 4 and 5. The reference characters used to designate corresponding portions of the structure are the same as those used in FIGS. 1 to 3. This embodiment is shown with two securing points 40 and 42 on the float although only one (eg. 40) may be used if preferred. Point 42 should be used to attach the line 28 from the float to the hook 30. Once more, an engaging slot or cutaway portion 36 is provided in the float body portion 20b. The placing of the line 28 in the engaging slot 36 is facilitated by providing the slot 36 with a lead-in tapered portion 38 (FIG. 4). As with the embodiment shown in FIG. 1, more than one slot may be used around the periphery of the storage groove if desired. Attachment point 40 may be positioned coincidental with the end point of the body portion 20a, as shown, to give better floating position, under some circumstances, after the float is on the surface of the water and the line has unwound from the storage groove 32.

Yet another embodiment of the invention is illustrated in FIGS. 6, 6A and 7. There, a plurality of engaging slots 44 are shown, each much shorter than in FIG. 4 and 5 embodiment and having a slanted back wall 46. This embodiment may be desirable for certain applications and manufacturing processes. The float attachment devices 48 and 50 are illustrated as connected together and formed from the same construction material, for example a metal wire 52 which passes through the center of the float.

Still another embodiment of the invention is shown in FIGS. 8 and 9. There, the mid-portion of the float body is dished out to form a broad circumferential storage groove 56 defined by long, tapering and smoothly curved sides 56'. The float ends 58 are of large diameter relative to that of the mid-portion of the float. This float design may be desirable when great end buoyancy is required. A notch or slot 60 is provided along the side of the float body near one end for defining a line engaging surface 62 for contacting and retaining the line 28 (not shown in FIGS. 8 and 9) in the slot in a manner similar to that described for the embodiment of FIGS. 1–3. As before, the surface 62 is disposed at an acute angle, 61 with respect to the opposing portion 64 of the float body. The outer edge 65 of the surface 62 is formed at an acute angle 59, preferably about 40 degrees to 70 degrees, with respect to the largest circumference of the float end 58. In this instance the acute angles 59 and 61 counteract any tendency of the line to slip free from the long tapering sides 56' of the circumferential groove 56. Connection means 66 is provided on the end of the float opposite the slot 60 for attaching a fishing line and rod to the float.

FIGS. 10 and 11 show yet another embodiment of the invention. In this instance the circumferential storage groove 68 is defined by a pair of protrusions 70, 71 for preventing the line from unwinding along the float periphery.

In utilizing the invention (as depicted in all of its embodiments, but described here in terms of FIGS. 1–3), the fisherman attaches the hook 30 to the end of the line 28, and secures the float 20 to the line at a desired distance from the hook. Bait may be placed on the hook at this time or later. The line between the hook 30 and the float 20 is wrapped in the storage groove 32 around the float until only about 12 inches or less of unwrapped line remain. While the float is held in an upright (engaging surface 37 in the lower portion) position, the remaining line is placed against the engaging surface 37 and allowed to hang downward. Care must be taken to keep the float in this position prior to imparting thrust to it. As thrust is provided to the float and hook, either by means of a fishing rod or otherwise, the hook will trail the float in the air and the line remains against the engaging surface. During the remainder of the cast, while the motion of the float 20 is provided by impetus given it during the thrust period, the line may or may not remain against the engaging surface depending upon the relative positions of the float and hook. These relative positions will stay the same or change depending upon the individual momentum and air resistance of each object being cast. If the float does catch up to the hook in the air, the line 28 may, by rotating the float, partially or fully unwind from the storage groove while still airborne. After the float has landed on the surface of the water, the hook 30 sinks until it causes the line to unwind from the float as the float rotates on the water surface. If desired, each longitudinal half of the float may be provided with a different color to allow the fisherman to more easily see the float rotation and to know when his hook has attained desired depth.

While the invention has been illustrated and described with a float having a circular cross-section, it will be understood that the float may alternatively be provided with an eliptical or polygonal cross-section, or even a cross-section of free form. Any such float shape can be employed in carrying out the invention so long as the float remains rotatable in the water to permit unwrapping of the stored line from the storage groove so that the line may descend into the water.

I claim:

1. A float for use in casting comprising, in combination: a float body; means carried on said body for attachment to a line; a pair of opposing first and second surfaces on said body defining a peripheral groove therein for wind-up storage of the line prior to and during casting of the float and line, said peripheral groove having the same axis of rotation as that of the float when the float is placed on the water surface; said body including a line engaging surface positioned for abutting contact with, to thereby prevent unwinding of, the stored line from the groove during casting of the float and line; one of the opposing surfaces being located farther than the other from the attachment means, the float body portion adjacent said one opposing surface being provided with a slot for receiving the end portion of the line, said slot being defined in part by the line engaging surface, and the line engaging surface being disposed approximately perpendicular to said one opposing surface; and said float having an external contour so that the float is rotatable on the surface of the water, with its axis of rotation generally parallel to the water surface, after casting whereby the stored fishing line unwinds from the groove upon rotation of the float, thus permitting the line to descend beneath the water surface.

2. A float as defined in claim 1 in which the slot is provided with a lead-in taper to facilitate placing of the line in the slot.

* * * * *

Dedication and Disclaimer 3,832,797.—*Richard W. Smedley*, Joliet, Ill. FISHING FLOAT, Patent dated Sept. 3, 1974. Disclaimer and dedication filed Jan. 2, 1980, by the inventor.

Hereby disclaims and dedicates to the Public the entire remaining term of said patent.

[*Official Gazette, April 15, 1980.*]